US008719588B2

(12) United States Patent
Garner et al.

(10) Patent No.: US 8,719,588 B2
(45) Date of Patent: May 6, 2014

(54) MEMORY ADDRESS OBFUSCATION

(75) Inventors: Brad Garner, Pueblo, CO (US); Balaji Badam, Colorado Springs, CO (US)

(73) Assignee: Atmel Corporation, San Jose, CA (US)

( * ) Notice: Subject to any disclaimer, the term of this patent is extended or adjusted under 35 U.S.C. 154(b) by 1336 days.

(21) Appl. No.: 12/165,550

(22) Filed: Jun. 30, 2008

(65) Prior Publication Data

US 2009/0327709 A1     Dec. 31, 2009

(51) Int. Cl.
  G06F 12/14     (2006.01)
  G06F 21/14     (2013.01)
  G06F 21/12     (2013.01)

(52) U.S. Cl.
  CPC ............ *G06F 12/1408* (2013.01); *G06F 21/14* (2013.01); *G06F 21/123* (2013.01)
  USPC ........... 713/190; 713/189; 713/193; 711/163; 711/164; 711/202; 711/207; 711/220; 380/286

(58) Field of Classification Search
  CPC ............................. G06F 12/1408; G06F 21/75
  USPC .......... 713/162, 190, 189, 193; 711/103, 108, 711/163, 164, 202, 207, 220; 380/277–286
  See application file for complete search history.

(56) References Cited

U.S. PATENT DOCUMENTS

| 5,237,611 | A * | 8/1993 | Rasmussen et al. | 380/284 |
| 7,266,690 | B2 * | 9/2007 | Field | 713/165 |
| 2005/0114610 | A1 * | 5/2005 | Robinson et al. | 711/152 |
| 2008/0256369 | A1 * | 10/2008 | Umeno | 713/193 |

OTHER PUBLICATIONS

Tuck, N.; Calder, B.; Varghese, G.;"Hardware and Binary Modification Support for Code Pointer Protection From Buffer Overflow", Microarchitecture, 2004. MICRO-37 2004. 37th International Symposium on Publication Year: 2004 , pp. 209-220. [retreived from IEEE database on Feb. 22, 2011].*

C. Cowan, S. Beattie, J. Johansen, and P. Wagle. PointGuard: Protecting pointers from buffer overflow vulnerabilities. In Proceedings of the 12th USENIX Security Symposium. Washington, DC, Aug. 2003. [retrieved from Citeseer database on Feb. 22, 2011].*

Bhatkar et al., Address Obfuscation: an Efficient Approach to Combat a Broad Range of Memory Error Exploits, Aug. 2003, Proceedings of the 12th conference on USENIX Security Symposium, vol. 12.*

Bhatkar, Sandeep, et al., "Address Obfuscation: an Efficient Approach to Combat a Broad Range of Memory Error Exploits", *USENIX Security Symposium*, Aug. 2003.

* cited by examiner

*Primary Examiner* — Saleh Najjar
*Assistant Examiner* — Louis Teng
(74) *Attorney, Agent, or Firm* — Fish & Richardson P.C.

(57) ABSTRACT

Apparatus, systems, and methods may operate to provide, to a memory device, an obfuscated clear-page address derived from a clear-page address that is not the same as a key-page address and/or providing, to the memory device, an obfuscated key-page address derived from the key-page address when the obfuscated clear-page address is the same as the key-page address. Additional apparatus, systems, and methods are disclosed.

24 Claims, 4 Drawing Sheets

MEMORY ADDRESS OBFUSCATION

BACKGROUND

Memory devices, such as electrically-erasable, programmable read-only memories (EEPROMs), are sometimes used in combination with address obfuscation, where a cryptographic key is used to obfuscate the address by which data is accessed. However, using the same key for a large number of devices can make the data more susceptible to brute force attacks.

DETAILED DESCRIPTION

Introduction

Figure 1:
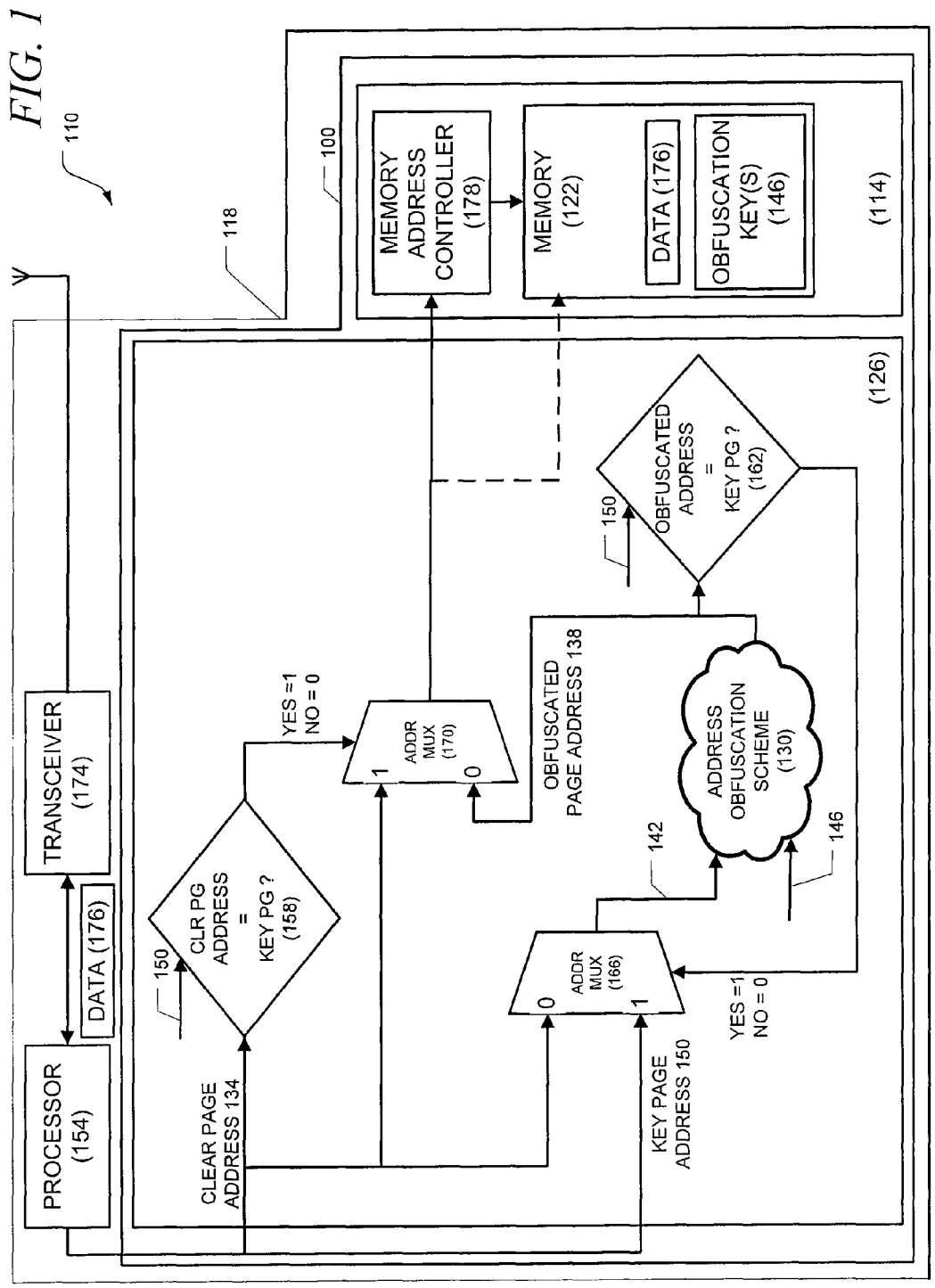
FIG. 1 is a block diagram of an apparatus and system according to an example embodiment.

Using different keys in different devices can render data in the memory less susceptible to attack, but also makes it difficult to store a particular key in a known location that is not easily overwritten. This is because the obfuscation key determines how memory addresses are mapped, and a different key in one device can result in a different memory map for that device. One approach to solving this problem includes mathematically eliminating the key-page from the obfuscation scheme. However, this reduces the number of available obfuscation keys, with a corresponding reduction in data security. Another potential solution is to store the keys in a different device, but that approach may also be less secure than desired.

The inventors have solved these problems, among others, by using randomly-generated obfuscation keys stored in a fixed key-page location. That is, each memory device may have the same set of locations where obfuscation keys are stored, but the keys stored therein are different from device to device. In essence, this results in data storage locations that vary randomly from device to device.

Thus, when the mechanisms described herein are employed, a non-volatile memory device can be made with a key-page selected to occupy any set of locations in the device. One or more randomly-generated keys can then be stored in the key-page and used to implement address obfuscation for that device.

Definitions

For the purposes of this document, the term "clear-page address" is the address that is presented, prior to obfuscation, to access a memory device. When the clear-page address is equal to the key-page address, it can be used directly, without obfuscation, to access the memory device. The result is direct access to the obfuscation key(s) stored in the memory device.

If the clear-page address is not equal to the key-page address, the clear-page address is obfuscated and compared to the key-page address. If they are equal, the obfuscated page address is changed to prevent over-writing the key-page. In this case, to get a new obfuscated page address, the key-page address is obfuscated to provide an obfuscated key-page address. This resulting address will not be produced by obfuscating any other clear-page address, and can therefore be used to access the memory device directly.

A "key-page address" is the address in a memory that is used to store one or more keys that influence the result of an obfuscation scheme or algorithm. In many embodiments, the key-page address can be arbitrarily chosen by the memory manufacturer, or by the engineer that uses the memory device in their own design.

"Non-volatile" memory devices include any memory device that retains its content when power is no longer applied, so that the retained content can be accessed at a later time. Non-volatile memory devices include EEPROM, flash memory, and magnetostrictive random access memory (RAM), among others.

"Obfuscation," in the context of addressing memory, is the process of encoding an input address (for example, using an obfuscation algorithm influenced by the use of one or more keys) to produce an output address different from the input address. Given a particular non-obfuscated address, an obfuscation scheme or algorithm, and a key, the resulting obfuscated address will always be the same. However, if the scheme/algorithm or key changes, the obfuscated address may be different. Thus, memory address obfuscation may or may not be reversible.

An "obfuscated-page address" is a page address that has been changed using an obfuscation scheme/algorithm and at least one key.

Those readers that desire to know more about the process of obfuscation, and obfuscation schemes, are encouraged to consult "Address Obfuscation: an Efficient Approach to Combat a Broad Range of Memory Error Exploits", Bhatkar et al., Proceedings of the 12th conference on USENIX Security Symposium, Vol. 12, August 2003, a reference that is well-known to those of ordinary skill in the art. The use of obfuscation as implemented in various example embodiments will now be described.

Apparatus and Systems

FIG. 1 is a block diagram of an apparatus 100 and system 110 according to an example embodiment. Here it can be seen that an apparatus 100 to access memory devices 114 using an obfuscation scheme 130 may comprise a substrate 118, an array 122 of nonvolatile memory cells supported by the substrate 118, and an address alteration module 126 to provide an obfuscated address, such as an obfuscated clear-page address. In some embodiments, the array 122 of nonvolatile memory cells comprise EEPROM cells. In an embodiment, the apparatus 100 includes one or more memory devices 114 and one or more address alteration modules 126.

The address alteration module 126 implements an address obfuscation scheme 130, which may be as simple as using the clear-page address 134 as one part of an address range, and a single key as another, both coupled to the address input bits of a read-only memory (ROM) that has obfuscated addresses stored therein. Thus, when the key and a non-obfuscated address are applied to the ROM address inputs, an obfuscated (i.e., re-mapped) page address 138 appears at the outputs. More complex implementations are possible, including the application of a coding algorithm to the non-obfuscated input (e.g., clear-page) address 142, along with one or more keys 146, to provide an obfuscated page address 138.

The obfuscated clear-page address can be provided to the array 122 by obfuscating a clear-page address 134 that is not the same as a key-page address 150 of the array 122. The address alteration module 126 can also be used to provide an obfuscated key-page address when the obfuscated clear-page address is the same as the key-page address. Both the clear-page address 134 and the key-page address 150 can be provided by a processor 154.

The apparatus 100 may include a comparator 158 to couple to the clear-page address 134 and the key-page address 150. The apparatus 100 may include another comparator 162 to couple to the key page address 150 and the obfuscated page address 138.

In some embodiments, the apparatus 100 comprises a multiplexer 166 to couple to the clear-page address 134 and the key-page address 150. The apparatus 100 may include another multiplexer 170 to couple to the clear-page address 134 and the obfuscated page address 138. Thus, for example, the apparatus 100 may include a pair of multiplexers 166, 170 to couple to the clear-page address 134, the key-page address 150, and an obfuscated page address 138 derived from one of the clear-page address 134 and the key-page address 150.

As can be seen in the figure, the output of the comparators 158, 162 may comprise either a logical one or zero, depending on whether the answer to the question posed within the comparator is YES or NO, respectively. Thus, for example, if the comparator 158 receives a clear page address 134 that is equal to the key page address 150, then the answer to the question posed (as to whether the clear page address 134 is equal to the key page address 150) is YES, and the input labeled "1" of the multiplexer 170 is selected. This results in the clear page address 134 being passed on to the memory address controller 178. If the received addresses are not equal, then the answer to the question posed by the comparator 158 is NO, and the input labeled "0" is selected by the multiplexer 170, resulting in the obfuscated page address 138 being passed on to the memory address controller 178. The comparator 162 and the multiplexer 166 operate in a similar fashion, passing on either the clear page address 134 or the key page address 150, depending on the result of the comparison. The logic functions shown in each case are given by way of illustration, and not limitation.

Many other embodiments can be realized. For example, a system 110 used to access memory devices 114 using an address obfuscation scheme 130 may comprise a wireless transceiver 174, a processor 154 to send data 176 to the wireless transceiver 174, and one or more nonvolatile memory devices 114 to store the data 176. The system 110 may also include an address alteration module 126 to provide an obfuscated clear-page address to one of the nonvolatile memory device 114 or a memory address controller 178 coupled to the nonvolatile memory device 114. In some embodiments, the system 110 may comprise any one or more of a cellular telephone, a desktop computer, a laptop computer, a personal digital assistant (PDA), or any other processor-driven computation device.

Any of the components previously described can be implemented in a number of ways, including simulation via software. Thus, the apparatus 100; system 110; memory device 114; substrate 118; array 122; address alteration module 126; address obfuscation scheme 130; clear-page address 134; obfuscated page address 138; non-obfuscated input address 142; keys 146; key-page address 150; processor 154; comparators 158, 162; multiplexers 166, 170; transceiver 174; data 176; and memory address controller 178 may all be characterized as "modules" herein.

These modules may include hardware circuitry, single or multi-processor circuits, memory circuits, software program modules and objects, firmware, and combinations thereof, as desired by the architect of the apparatus 100 and system 110, and as appropriate for particular implementations of various embodiments. The modules may be included in a system operation simulation package such as a software electrical signal simulation package, a power usage and distribution simulation package, a power/heat dissipation simulation package, a signal transmission-reception simulation package, or any combination of software and hardware used to simulate the operation of various potential embodiments. Such simulations may be used to characterize or test the embodiments, for example.

It should also be understood that the apparatus and systems of various embodiments can be used in applications other than desktop or laptop computers having single or multi-core processors. Thus, various embodiments of the invention are not to be so limited. The illustrations of apparatus 100 and systems 110 are intended to provide a general understanding of the structure of various embodiments, and they are not intended to serve as a complete description of all the elements and features of apparatus and systems that might make use of the structures described herein.

Applications that may include the novel apparatus and systems of various embodiments include electronic circuitry used in high-speed computers, communication and signal processing circuitry, modems, single or multi-processor modules, single or multiple embedded processors, and application-specific modules, including multilayer, multi-chip modules. Such apparatus and systems may further be included as sub-components within a variety of electronic systems, such as data bridges, switches, and hubs; televisions and cellular telephones; personal computers and workstations; radios and video players; and vehicles, among others.

Methods

Figure 2:
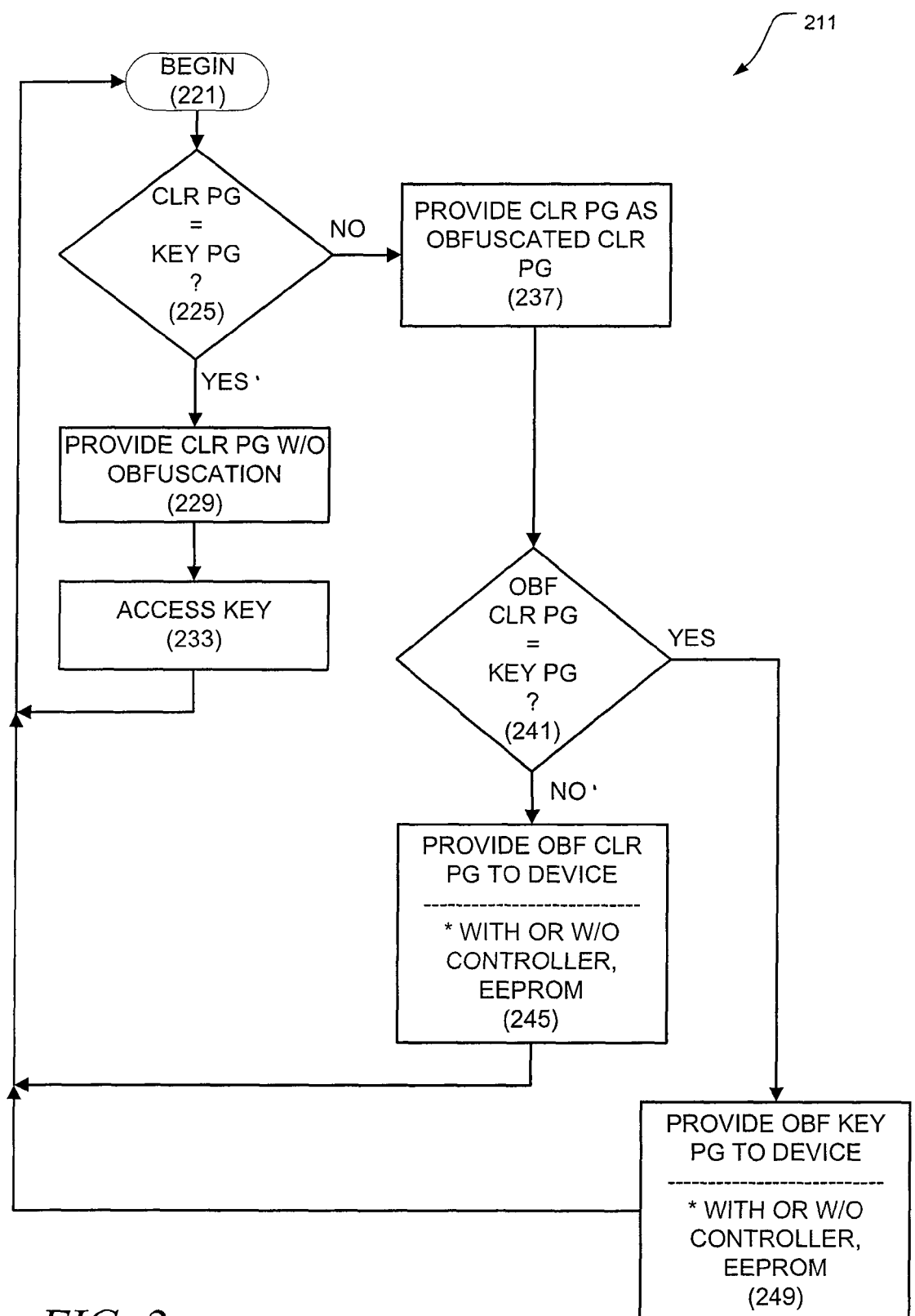
FIG. 2 is a flow diagram of various methods of operating devices that include one or more random obfuscation keys according to an example embodiment.

Some embodiments may include a number of methods. For example, FIG. 2 is a flow diagram of various methods 211 of operating devices that include one or more random obfuscation keys according to an example embodiment. In some embodiments, a method 211 may begin at block 221 and continue on to block 225 with comparing the clear-page address to the key-page address. The method 211 may continue on to block 229 with providing the clear-page address without obfuscation to the memory device when comparing at block 225 indicates that the clear-page address is the same as the key-page address. The method 211 may then continue on to block 233 with accessing a substantially-randomly generated obfuscation key stored at the key-page address comprising a fixed address. The method 211 may continue on from block 233 to block 221.

In some cases, the method 211 may continue from block 225 on to block 237, so that the method 211 includes providing, to the memory device, a clear-page address as the obfuscated clear-page address when comparing at block 225 indicates that the clear-page address is not the same as the key-page address. The method 211 may include going on to block 241 with comparing the obfuscated clear-page address to the key-page address.

The method 211 may go on to include providing, to the memory device, an obfuscated clear-page address derived from a clear-page address that is not the same as the key-page address at block 245, if comparing at block 241 indicates that the obfuscated clear-page address is not the same as the key-page address. If the obfuscated clear-page address is the same as the key page address, as determined by the comparing activity at block 241, then the method 211 may include going on to block 249 with providing, to the memory device, an obfuscated key-page address derived from the key-page address.

Thus, with respect to blocks 245 or 249, the method 211 may comprise selecting between providing one of the clear-page address and the key-page address to a memory obfuscation module. Similarly, the method 211 at blocks 245 or 249 may include providing one of the obfuscated clear-page address or the obfuscated key-page address to the memory device, which may comprise an array of EEPROM cells. In some embodiments, the method 211 at block 245 or 249 may include selecting between providing one of the clear-page address and the obfuscated clear-page address to the memory device comprising a memory address controller coupled to an array of memory storage locations. The method 211 may continue on from either of blocks 245 or 249 to block 221. Additional embodiments may be realized.

Figure 3:
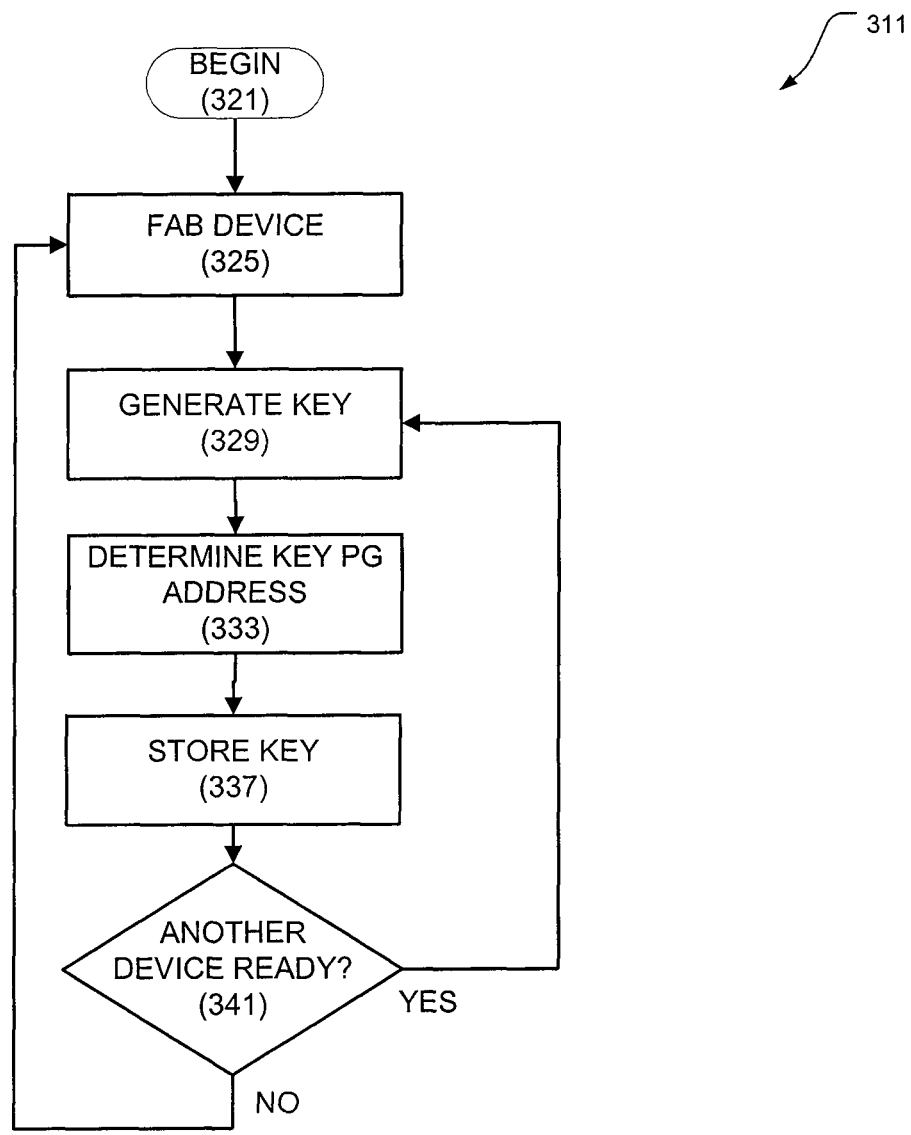
FIG. 3 is a flow diagram of various methods of making devices that include one or more random obfuscation keys according to an example embodiment.

For example, FIG. 3 is a flow diagram of various methods 311 of making devices that include one or more random obfuscation keys according to an example embodiment. Thus, a method 311 of making random obfuscation key devices may comprise beginning at block 321, and continuing on to block 325 with fabricating a non-volatile memory device. The activity at block 325 may include fabricating one or more portions of the nonvolatile memory as an array of nonvolatile memory cells, wherein some of the nonvolatile memory cells correspond to the key-page address. In some embodiments, the activity at block 325 may include fabricating the array of nonvolatile memory cells to include at least some EEPROM cells.

The method 311 may then include generating one or more substantially-random obfuscation keys at block 329, using any method well-known to those of ordinary skill in the art. The method 311 may go on to block 333 to include determining a key-page address as a fixed address within the memory device. The key-page address may be obtained by obfuscating at least one clear-page address using the substantially-random obfuscation key generated at block 329.

The method 311 may go on to storing one or more substantially-random obfuscation keys in the key-page address at block 337. If it is determined that another device is ready to receive one or more keys at block 341, then the method 311 may include repeating key generation, determining the key page address, and storing the key(s) for a plurality of memory devices, each having the same key page address and one or more different substantially-random obfuscation keys. The method 311 may then continue on from block 341 to block 329.

If another device is not ready to receive one or more keys, as determined at block 341, then the method 311 may continue from block 341 on to block 325 with fabricating another device.

The methods described herein do not have to be executed in the order described, or in any particular order. Moreover, various activities described with respect to the methods identified herein can be executed in repetitive, serial, or parallel fashion. The individual activities of the methods shown in FIGS. 2 and 3 can also be combined with each other and/or substituted, one for another, in various ways. Information, including parameters, commands, operands, and other data, can be sent and received in the form of one or more carrier waves.

Articles of Manufacture

One of ordinary skill in the art will understand the manner in which a software program can be launched from a computer-readable medium in a computer-based system to execute the functions defined in the software program. Various programming languages may be employed to create one or more software programs designed to implement and perform the methods disclosed herein. The programs may be structured in an object-orientated format using an object-oriented language such as Java or C++. Alternatively, the programs can be structured in a procedure-orientated format using a procedural language, such as assembly or C. The software components may communicate using a number of mechanisms well known to those skilled in the art, such as application program interfaces or interprocess communication techniques, including remote procedure calls. The teachings of various embodiments are not limited to any particular programming language or environment.

Figure 4:
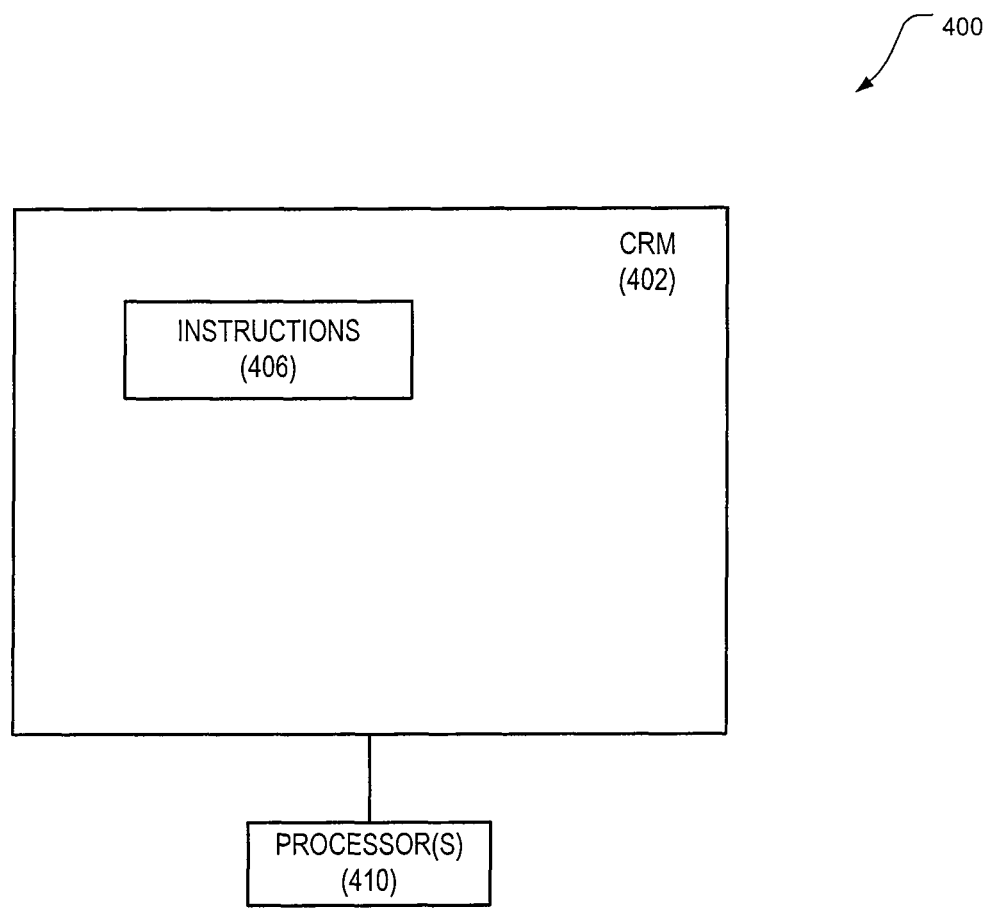
FIG. 4 is a block diagram of an article of manufacture, including a computer-readable medium according to an example embodiment.

Thus, other embodiments may be realized. For example, FIG. 4 is a block diagram of an article 400 of manufacture, including a computer-readable medium (CRM) 402 according to an example embodiment. The article 400 may comprise a computer, an integrated circuit, a memory system, a magnetic or optical disk, some other storage device, and/or any type of electronic device or system. Thus, the article 400 may include a computer 410 (having one or more processors) coupled to a computer-readable medium 402, such as a memory (e.g., fixed and removable storage media, including tangible memory having electrical, optical, or electromagnetic conductors), having associated information 406 (e.g., computer program instructions and/or data), which when executed by the computer 410, causes the computer 410 to perform a method comprising providing, to a memory device, an obfuscated clear-page address derived from a clear-page address that is not the same as a key-page address. An example of such a medium 402 and information 406 include a die with micro-code.

Further activity may include providing, to the memory device, an obfuscated key-page address derived from the key-page address when the obfuscated clear-page address is the same as the key-page address. Other activities may include any of those forming a portion of the methods illustrated in FIGS. 2 and 3, described above.

Conclusion

Implementing the apparatus, systems, and methods disclosed herein may operate to permit the manufacture of nonvolatile memory devices that include randomly-generated keys for obfuscated address access. Theoretically, each device may be assigned a uniquely different key. The security of the data retained in such devices may thus be improved over similar devices that include a fixed key value.

The accompanying drawings that form a part hereof show, by way of illustration and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein individually or collectively by the term "invention" merely for convenience and without intending to voluntarily limit the scope of this application to any single invention or inventive concept, if more than one is in fact disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R.§1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a few embodiments for the purpose of streamlining the disclosure. This method of disclosure is not to be interpreted to require more features than are expressly recited in each claim. Rather, inventive subject matter may be found in less than all features of a single disclosed embodiment. Thus the following claims are hereby incorporated into the Detailed Description, with each claim standing on its own as a separate embodiment.

What is claimed is:

1. A method, comprising:
   (a) comparing a clear-page address to a key-page address, wherein a clear-page address is associated with an address for accessing a memory device without obfuscation, and a key-page address is associated with an address in memory that is used to store keys for an obfuscation scheme;
   (b) responsive to the comparing of step (a) indicating the clear-page address is different from the key-page address, generating an obfuscated clear-page address by obfuscating the clear-page address;
   (c) comparing the obfuscated clear-page address to the key-page address;
   (d) providing, to the memory device, the obfuscated clear-page address based on the comparing of step (c) indicating that the obfuscated clear-page address is distinct from the key-page address; and
   (e) based on the comparing of step (c) indicating that the obfuscated clear-page address is the same as the key-page address, generating an obfuscated key-page address by encoding the key-page address and providing the obfuscated key-page address to the memory device.

2. The method of claim 1, further comprising:
   (f) providing the clear-page address without obfuscation to the memory device when the comparing of step (a) indicates that the clear-page address is the same as the key-page address.

3. The method of claim 1, further comprising: providing at least one of the obfuscated clear-page address and the obfuscated key-page address to the memory device comprising an array of electrically-erasable programmable read-only memory (EEPROM) cells.

4. The method of claim 1, wherein providing, to the memory device, the obfuscated clear-page address comprises:
   selecting between providing one of the clear-page address and the obfuscated clear-page address to the memory device comprising a memory address controller coupled to an array of memory storage locations.

5. The method of claim 1, further comprising:
   selecting between providing one of the clear-page address and the key-page address to a memory obfuscation module.

6. The method of claim 1, further comprising: accessing an obfuscation key stored at the key-page address comprising a fixed address.

7. The method of claim 1, further comprising:
   determining a key-page address as a fixed address associated with a memory device comprising a nonvolatile memory;
   storing one of a plurality obfuscation keys at a memory device location associated with the key-page address; and
   repeating the determining and the storing for a plurality of memory devices, each having the same key-page address and a different one of the plurality of obfuscation keys.

8. The method of claim 7, further comprising:
   fabricating at least a portion of the nonvolatile memory as an array of nonvolatile memory cells, wherein some of the nonvolatile memory cells correspond to the key-page address.

9. The method of claim 8, further comprising:
   fabricating the array of nonvolatile memory cells to include at least some electrically-erasable programmable read-only memory (EEPROM) cells.

10. The method of claim 7, wherein the key-page address may be obtained by obfuscating at least one clear-page address using an obfuscation key.

11. The method of claim 1, wherein generating the obfuscated clear-page address by obfuscating the clear-page address further comprises:
    modifying the clear-page address using the obfuscation scheme and at least one key such that the obfuscated clear-page address is distinct from the clear-page address.

12. The method of claim 1, wherein the keys are randomly generated.

13. An apparatus, comprising:
    a substrate;
    an array of nonvolatile memory cells supported by the substrate; and
    an address alteration module including instructions executable by a processor and operable to cause the processor to perform operations including:
    comparing a clear-page address to a key-page address, wherein a clear-page address is associated with an address for accessing a memory location in the array without obfuscation, and a key-page address is associated with an address in a memory location in the array used to store keys for an obfuscation scheme;
    responsive to the comparing indicating the clear-page address is different from the key-page address, generating an obfuscated clear-page address by obfuscating the clear-page address;
    providing the obfuscated clear-page address to the array based on the comparing indicating that the obfuscated clear-page address is distinct from the key-page address; and
    based on the comparing indicating that the obfuscated clear-page address is the same as the key-page address, generating an obfuscated key-page address by encoding the key-page address and providing the obfuscated key-page address to the array.

14. The apparatus of claim 13, wherein the nonvolatile memory cells comprise electrically-erasable programmable read-only memory (EEPROM) cells.

15. The apparatus of claim 13, wherein the address alteration module further comprises:
    a comparator to couple to the clear-page address and the key-page address.

16. The apparatus of claim 13, wherein the address alteration module further comprises:
    a multiplexer to couple to the clear-page address and the key-page address.

17. The apparatus of claim 13, wherein the address alteration module further comprises:
a pair of multiplexers to couple to the clear-page address, the key-page address, and an obfuscated page address derived from one of the clear-page address and the key-page address.

18. The apparatus of claim 13, wherein the keys are randomly generated.

19. A system, comprising:
a wireless transceiver;
a processor to send data to the wireless transceiver;
a nonvolatile memory device to store the data; and
an address alteration module including instructions executable by the processor and operable to cause the processor to perform operations including:
comparing a clear-page address to a key-page address, wherein a clear-page address is associated with an address for accessing a memory location in the nonvolatile memory device without obfuscation, and a key-page address is associated with an address in the nonvolatile memory used to store keys for an obfuscation scheme;
responsive to the comparing indicating the clear-page address is different from the key-page address, generating an obfuscated clear-page address by obfuscating the clear-page address;
providing the obfuscated clear-page address to one of the nonvolatile memory device or a memory address controller coupled to the nonvolatile memory device based on the comparing indicating that the obfuscated clear-page address is distinct from the key-page address; and
based on the comparing indicating that the obfuscated clear-page address is the same as the key-page address, generating an obfuscated key-page address by encoding the key-page address and providing the obfuscated key-page address to one of the nonvolatile memory device or the memory address controller.

20. The system of claim 19, further comprising:
a first multiplexer and a pair of comparators coupled to the key-page address.

21. The system of claim 20, further comprising:
a second multiplexer coupled to the clear-page address, wherein the first multiplexer is also coupled to the clear-page address.

22. A non-transitory computer-readable medium having instructions stored therein for causing a computer to implement a method, comprising:
(a) comparing a clear-page address to a key-page address, wherein a clear-page address is associated with an address for accessing a memory device without obfuscation, and a key-page address is associated with an address in memory that is used to store keys for an obfuscation scheme;
(b) responsive to the comparing of step (a) indicating the clear-page address is different from the key-page address, generating an obfuscated clear-page address by obfuscating the clear-page address;
(c) comparing the obfuscated clear-page address to the key-page address;
(d) providing, to the memory device, the obfuscated clear-page address based on the comparing of step (c) indicating that the obfuscated clear-page address is distinct from the key-page address; and
(e) based on the comparing of step (c) indicating that the obfuscated clear-page address is the same as the key-page address, generating an obfuscated key-page address by encoding the key-page address and providing the obfuscated key-page address to the memory device.

23. The medium of claim 22, wherein the method comprises:
(f) providing the clear-page address without obfuscation to the memory device when the clear-page address is the same as the key-page address.

24. The medium of claim 22, wherein the method comprises:
(g) accessing an obfuscation key stored at a memory location associated with the key-page address, the key-page address comprising a fixed address.

* * * * *

UNITED STATES PATENT AND TRADEMARK OFFICE
CERTIFICATE OF CORRECTION

PATENT NO. : 8,719,588 B2
APPLICATION NO. : 12/165550
DATED : May 6, 2014
INVENTOR(S) : Brad Phillip Garner and Balaji Badam It is certified that error appears in the above-identified patent and that said Letters Patent is hereby corrected as shown below:

On the Title Page, Col. 2 Item (56) (other publication) Line 3, Delete "[retreived" and insert --[retrieved--, therefor.

In the Claims
Column 8 Line 1 In Claim 7, after "plurality" insert --of--.

Signed and Sealed this
Twenty-second Day of July, 2014

Michelle K. Lee
*Deputy Director of the United States Patent and Trademark Office*